(No Model.) 4 Sheets—Sheet 2.
C. HELMAN.
CABLEWAY.
No. 548,441. Patented Oct. 22, 1895.
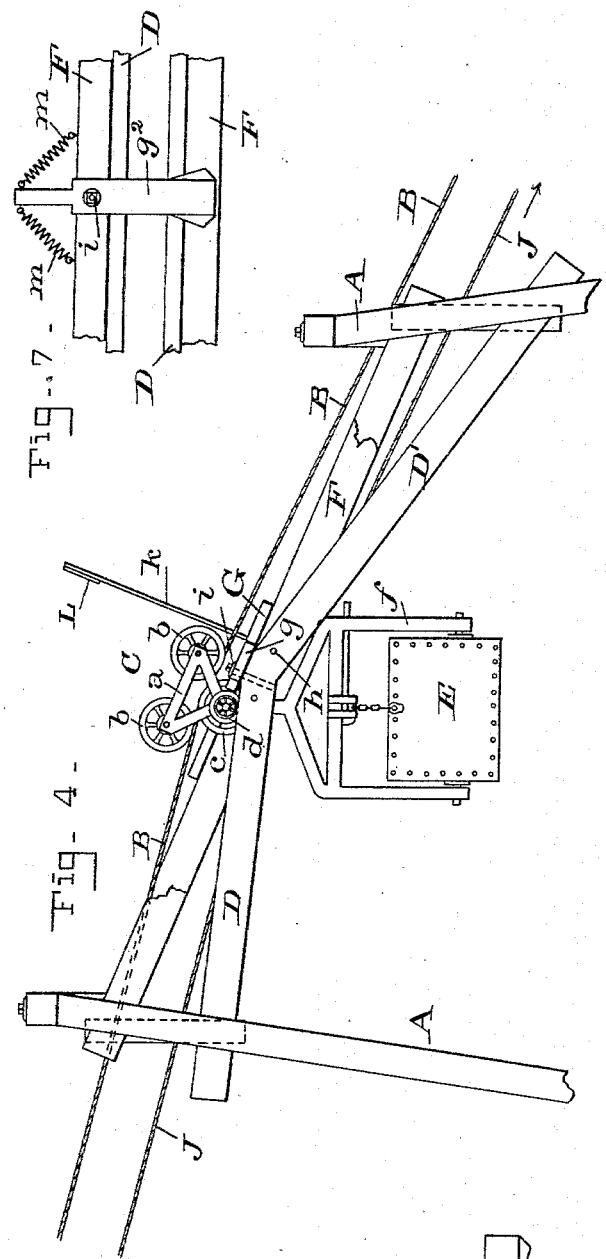
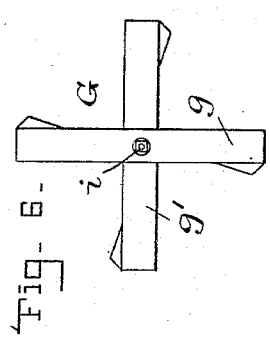
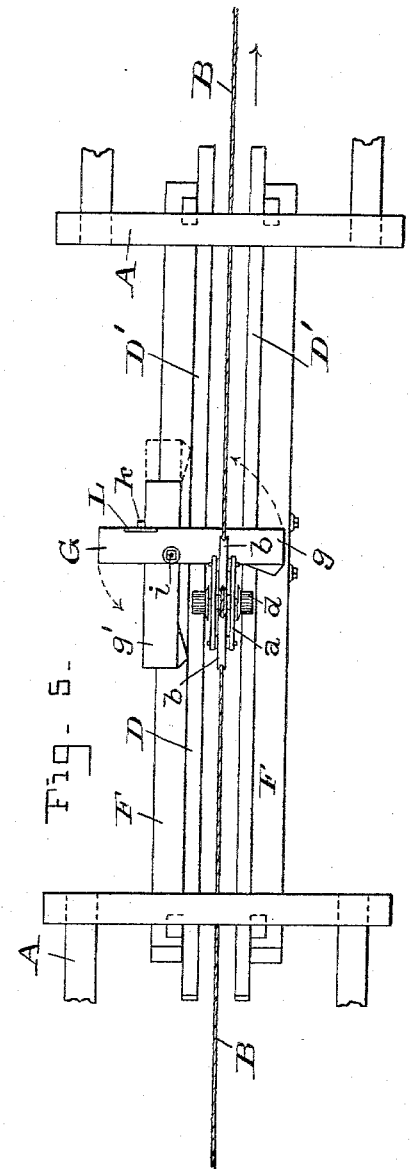
WITNESSES:
L. I. Van Horn.
Charles B. Mann Jr.
INVENTOR:
Charles Helman
By Chas. B. Mann
ATTORNEY (No Model.) 4 Sheets—Sheet 3.
C. HELMAN.
CABLEWAY.
No. 548,441. Patented Oct. 22, 1895.
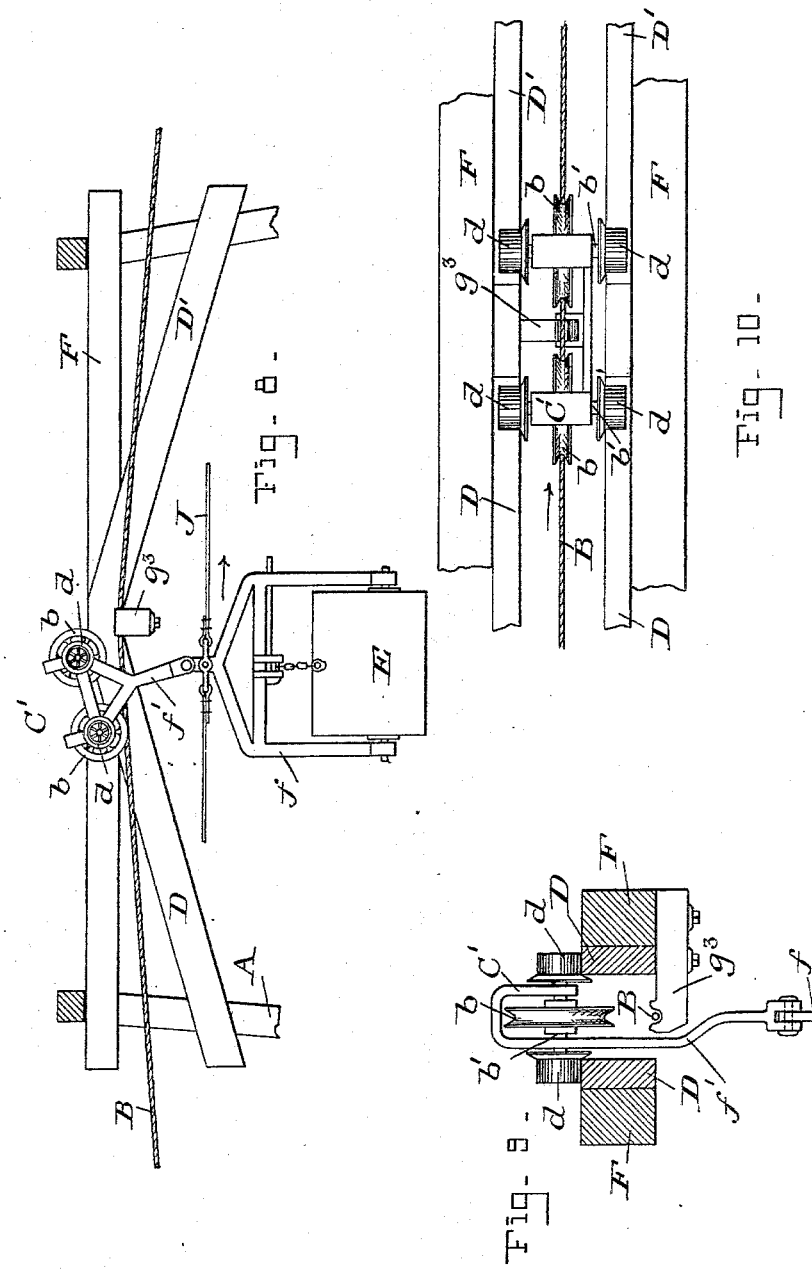
WITNESSES:
L. I. Van Horn
Charles B. Mann Jr.
INVENTOR:
Charles Helman
By Chas B. Mann
ATTORNEY.

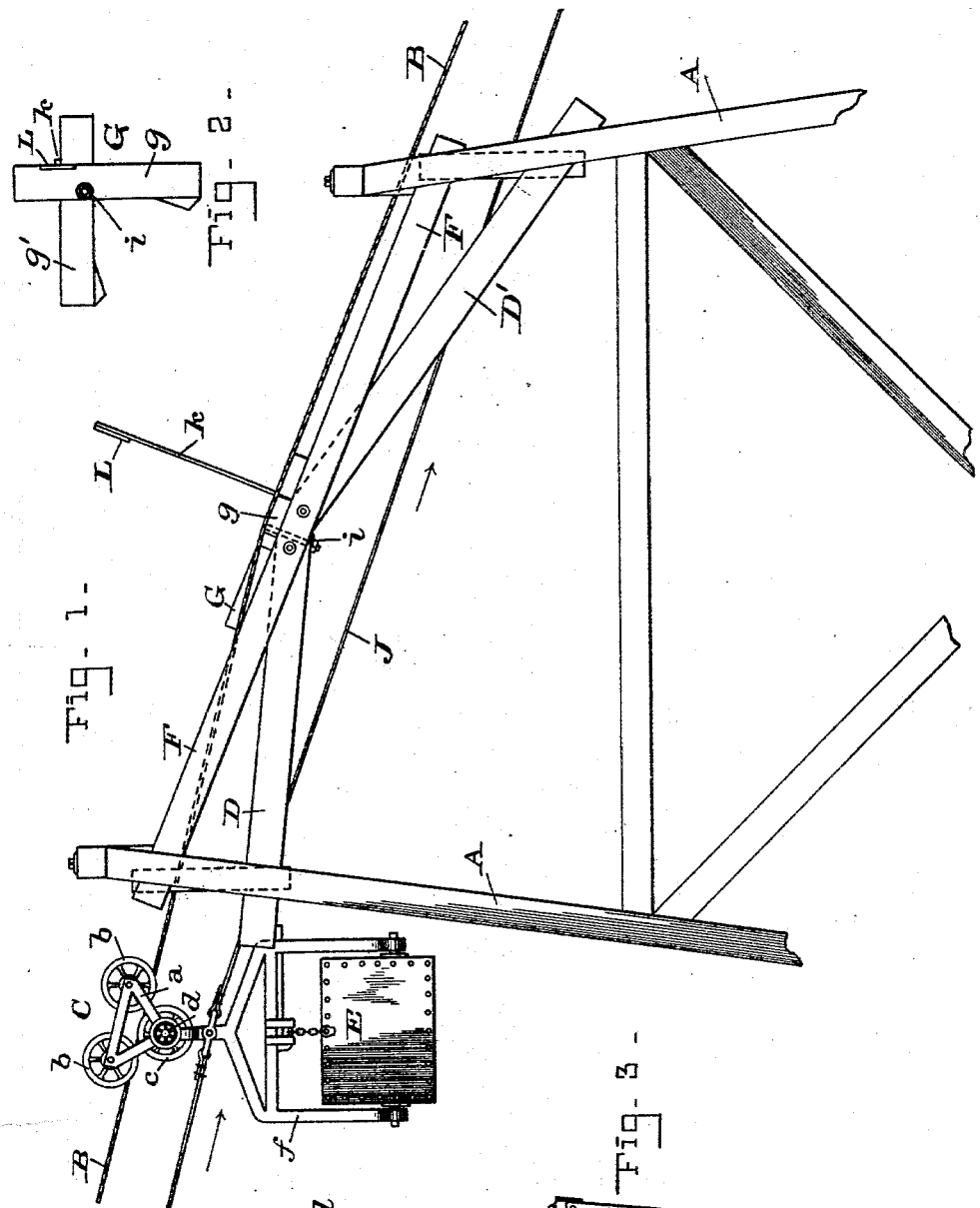

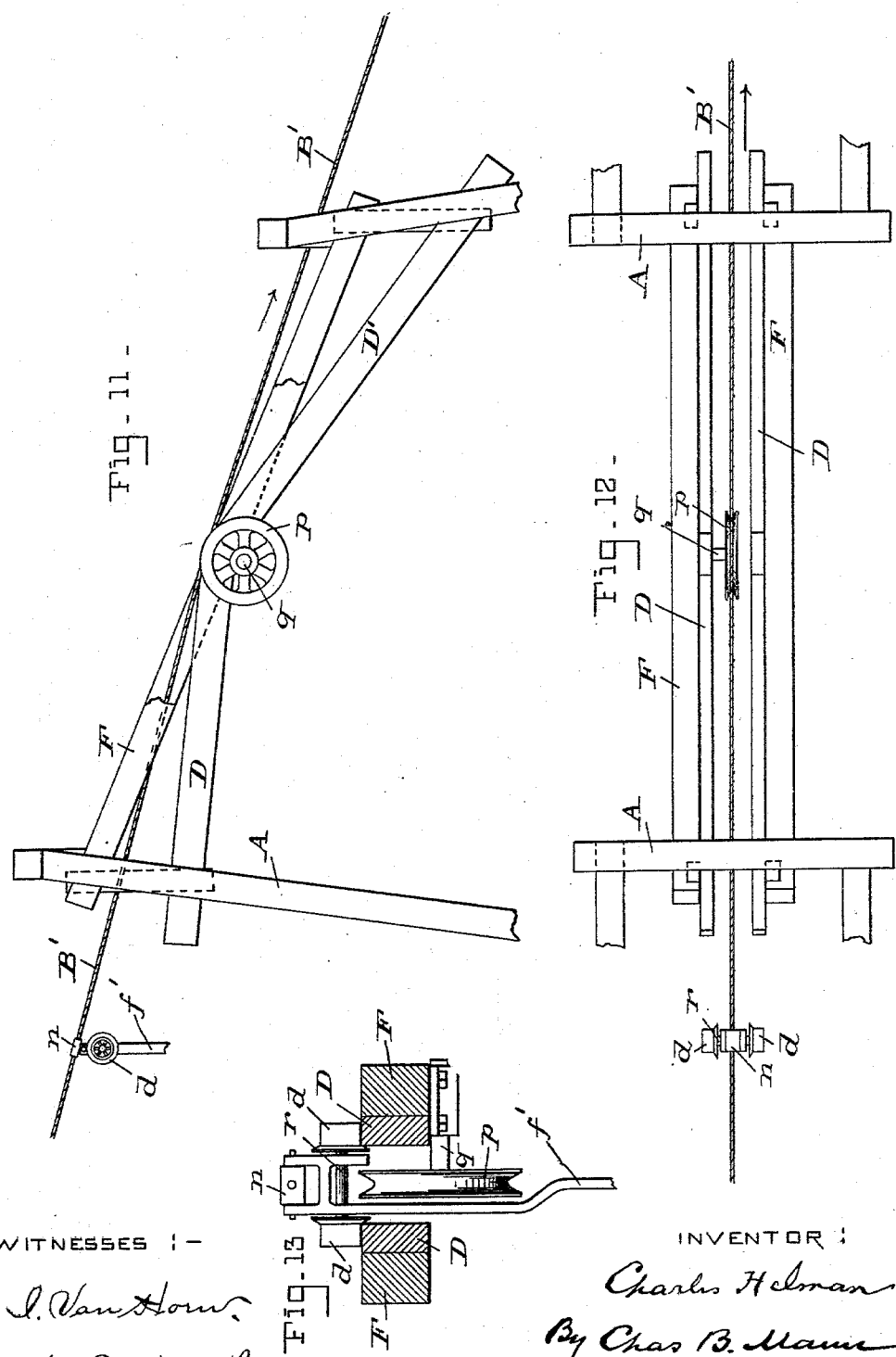

UNITED STATES PATENT OFFICE.

CHARLES HELMAN, OF OAKLAND, CALIFORNIA.

CABLEWAY.

SPECIFICATION forming part of Letters Patent No. 548,441, dated October 22, 1895.

Application filed March 16, 1895. Serial No. 541,972. (No model.)

*To all whom it may concern:*

Be it known that I, CHARLES HELMAN, a citizen of the United States, residing at Oakland, in the county of Alameda and State of California, have invented certain new and useful Improvements in Cableways and Methods of Operating Same, of which the following is a specification.

This invention relates to an improvement in cableways such as are used in mining, quarrying, bridge-building, and other operations for carrying stone or other material.

This invention is applicable to a cableway system where a fixed cable is used as a track and traversed by a trolley carrying a pendent cage or car, and it is also applicable to a system where an endless moving cable has pendent carriers, cages, or cars attached by clips. In these cableways it is often necessary to provide intermediate towers or other supports for the cable in addition to terminal supports. In such cases the cable is subjected to a more or less sharp bend where it rests on the bearing of the tower or other support, and is subjected to excessive wear and tear at each side of said bearing points, resulting in weakening the cable and soon rendering it unsafe for use.

The object of this invention is to provide improved means to obviate the excessive wear referred to, so that when a pendent load moving along a cable reaches an intermediate tower or other support the weight of the load will be wholly transferred from the cable to the tower or support until the moving load has passed said tower or support, and then the weight will be again transferred to the cable.

In the accompanying drawings, Figure 1 is a side elevation of an intermediate supporting-tower and a stationary cable with the traveler and bucket about to enter the tower. Fig. 2 is a plan view of a form of turnstile which may be used as a bearing to support the cable. Fig. 3 is a view of one form of traveler and bucket and shows the side wheels on the traveler. Fig. 4 is a side elevation of the same tower seen in Fig. 1, and shows the traveler and bucket at the turnstile ready to pass the latter, the cable being raised to permit the turnstile to rotate. Fig. 5 is a top or plan view of the parts seen in Fig. 4. Fig. 6 shows a form of turnstile with four arms. Fig. 7 shows a modification of turnstile with single arm. Fig. 8 is a side elevation of a modified form of traveler; Fig. 9, a transverse elevation of same and a cross-section of track-rails; and Fig. 10, a top view of traveler and frame, illustrating a form of traveler which will pass the support or bearing of a fixed cable without the cable being raised and without the use of a turnstile. All the foregoing figures illustrate a system where a fixed cable is traversed by a trolley or traveler. Figs. 11 and 12 are side and plan elevations, respectively, showing a tower-frame and grooved wheel-support for an endless moving cable and the improved clip with side wheels. Fig. 13 is a view of the improved clip shown in last two figures and side wheels resting on the rails of the tower.

This improvement is applicable to incline cableways whether the carrier or bucket which travels on the cable be operated by power or gravity, and it is also applicable to long stretches of horizontal cableways where intermediate supporting-towers are employed.

Referring to the drawings, Figs. 1 to 7, inclusive, the letter A designates the framework of an intermediate tower, and B the fixed traverse rope or cable track, which in this instance is represented as inclined and which is supported by said tower. The traveler C comprises a triangular frame $a$, in which are mounted two trolley-wheels $b$, which rest on top of the cable B and travel thereon. A third wheel $c$ on the lower part of the traveler-frame takes below the cable and keeps the upper wheels of the traveler thereon and also serves to raise the cable at the bearings, as hereinafter described. The triangular frame $a$ has two sides, and the three wheels $b\ b\ c$ are between the two sides. On the exterior of the two side frames $a$ and on the shaft $c'$ of the third wheel are side wheels $d$, which are flanged to travel on the two parallel rails D of the permanent track on the tower. The side wheels $d$ are free to turn independently of the third wheel $c$. The cage, car, or bucket E has a hanger or bail $f$, of any preferred construction, which is attached to or supported from the trolley-frame C by any suitable connection. The hanger or bail when passing the tower extends down through and moves along an open space between the two parallel track-rails D, and the cage, car, or bucket E is pendent from the hanger on a plane below said track-rails. In the present instance it is deemed unnecessary to illustrate any mechanism for raising or lowering the bucket, as where it is desired to raise or to lower any well-known means for this purpose may be employed.

The cable is stretched or has position coincident with the vertical plane of the open space between the two parallel rails D. The bearing on the tower on which the traverse cable B is supported is designated by the letter $g$. It will be observed this is the point where the bend and severe wear, heretofore referred to, occur in the cable, the bend being a consequence of the cable resting on said bearing $g$. The two permanent parallel track-rails D D', which are secured on the tower, have such position relative to the bearing $g$ or bend that they incline upward toward said bearing or bend, and these rails are highest where they are adjacent said bearing or bend. One set of rails D extends or inclines from one side of the tower toward the center, and the other set D' extends or inclines from the opposite side toward the center, and at the center the ends of the two sets D and D' abut or come together, and this abutting point constitutes the highest point of said track-rails. Two parallel rails are in the set D and also two in the set D'.

Two parallel bars F are on the tower extending in the same general direction as the permanent track-rails D D', and at the center these bars have the same height as the track-rails at their highest point and are secured to the track-rails by bolts $h$. As the cage, car, or bucket travels, the bail $f$ of the bucket passes along the space between the two parallel bars F. On these bars F a turnstile G, Figs. 1, 4, and 5, is mounted and secured by a pivot-bolt $i$ on one of the bars. The turnstile may have two right-angled arms, as in Figs. 2 and 5, which is a form suitable for use in a cable-way where the carrier and bucket go down and return on the same cable B; but the turnstile may have four arms, like a cross, as in Fig. 6, so as to revolve continuously if the bucket and carrier are to return on a different stretch of rope. A rope J, attached to the traveler C, moves the latter and the cage or bucket. One of the arms $g$ or $g'$ of the turnstile must always project across the space between the two parallel bars F and take under the cable B. This cross-projecting arm, therefore, is the bearing $g$, on which the cable is supported, and the bend in the cable is caused by resting on this arm. When the traveler C comes in contact with the cross-projecting arm $g$ of the turnstile, this latter will move out of the way and allow the traveler to pass, and the next arm $g'$ of the turnstile will take the cross position.

It will be seen that when the traveler reaches an intermediate tower the side wheels $d$ will take on top of the low end of the permanent rails D, and as these wheels travel up the said rails toward the bearing-arm $g$, which is supporting the cable, the guide-wheel $c$ below the cable will gradually raise the cable until the latter is lifted off the said bearing-arm, as shown in Fig. 4. The wheel $c$ now supports the cable, and the bearing-arm is free and no longer supports the cable. As the traveler continues moving, the entire weight of the load (and also the lifted weight of the cable) is supported by the side wheels $d$, resting on and traversing the track-rails D. The continued movement of the traveler brings it against the cross-projecting bearing-arm $g$ of the turnstile and causes the latter to make a quarter-turn on its pivot $i$. Thus as one arm $g$ swings from under the cable the traveler passes and at the same time the other arm $g'$ takes its place below the cable, and the cable is then gradually lowered until its weight rests upon the said arm $g'$.

It will be seen that the operation of the elevated cableway, so as to avoid excessive wear and tear on the cable where it rests on bearings or supports intermediate of the terminal supports, consists of relieving the cable of the moving load as the load approaches the bearing, transferring said weight to the tower or support, which holds the bearing until the moving load has passed the bearing, and then, as the load recedes from the bearing, transferring the weight from the tower or support back to the cable again.

The turnstile carries a target comprising an upright arm $k$, on which is mounted a suitable target-head L. When the turnstile is in one position, the face of the target-head can be seen by the operator; but when the turnstile is in the other position this target-head will have been turned so as to present its edge to the view of the operator. The target, therefore, enables the operator, who is located at some distance, to know which way the turnstile stands.

In the drawings but one traverse rope and tower and one turnstile on the tower are shown. Of course one rope and turnstile may be used for the traveler and loaded bucket to pass down and another rope and turnstile on the same tower for the traveler and empty bucket to return. It has not been deemed necessary to illustrate more than is shown in the figures referred to.

In Fig. 7 I have shown one bearing-arm $g^2$, pivoted at $i$, and springs $m$ to keep it normally projecting, so as to take under the cable. This construction will allow the traveler to pass in either direction.

Figs. 8, 9, and 10 illustrate a construction for relieving the cable of the weight of the load without the use of a turnstile or other swinging arm, and also without raising the fixed cable from the bearing. The stationary cable B rests upon the bearing $g^3$, which is on a tower or support A. The track-rails D D' in this case have their highest point adjacent and also above the bearing $g^3$. The traveler C' has the two trolley-wheels $b$, and four flanged side wheels $d$ are employed to travel on the track-rails D D' of the tower. In this instance the flanged wheels $d$ are on the ends of the shafts $b'$ of the trolley-wheels. The frame of the traveler C' has an open side, so as to readily place the trolley on the cable B or take it off. It will be seen that this form of traveler will allow of transferring the weight of the load from the cable to the tower-tracks until the moving load passes the bearings $g^3$, and then transferring the weight back again to the cable.

Figs. 11, 12, and 13 illustrate means for carrying out my invention where an endless moving cable is employed and the cages, cars, or buckets are attached to the cable by clips. The moving cable B' has clips $n$ of any approved form secured to the cable. Any number of clips may be attached. From these clips is a hanger or pendent arm $f'$, by which a cage, car, or bucket is suspended. In these last three figures the cage or bucket is not shown. The tower or support has the same track-rails D D' as heretofore described. In this case the bearing which sustains the cable is an ordinary grooved wheel $p$, which has position in the slot or space between the parallel track-rails. This wheel is on a shaft $q$, which is attached to the tower below one of the two parallel track-rails, so as to allow the hanger or pendent arm $f'$ to pass alongside of the wheel $p$. Now, the clip has a short cross-shaft $r$, on each end of which is a flanged side wheel $d$, same as in the other figures heretofore described. These side wheels travel on the track-rails D D', same as in the case of the travelers C and C'. It will be seen this device provides for transferring the weight of the load from the cable to the tower until the moving load passes the bearing (wheel $p$) and then transferring said weight back again to the cable.

Having thus described my invention, what I claim as new, and desire to secure by Letters Patent, is—

1. In an elevated cableway, the combination of a cable; a tower or support intermediate of the terminal supports and provided with two parallel track rails with an open space between them and also provided with a bearing for the cable intermediate of the said two rails, the cable and its bearing having position coincident with the vertical plane of the open space between the two rails; a hanger pendent from the cable and movable along the open space between said parallel rails and provided at opposite sides with wheels to travel on the said two rails and thereby relieve the cable of the weight of the load; and a cage, car or bucket supported by the said hanger on a plane below the said track rails, substantially as described.

2. In a cableway, the combination of a fixed cable; a tower for the cable intermediate of the terminal supports; a shifting bearing on the tower and normally projected under and across the line of the cable to support it; track rails also on the tower leading past said bearing; a traveler provided with wheels to traverse the said track rails, and said traveler adapted to shift said bearing; and means to lift the cable off said bearing during the passage of the traveler, substantially as described.

3. In a cableway, the combination of a fixed cable; a tower for the cable intermediate of the terminal supports; an arm pivoted on the tower and normally projected under and across the line of the cable to support it; a traveler which carries the load and travels along the cable and shifts the said pivoted arm; and means to restore the pivoted arm to its normal position when the traveler shall have passed.

4. In a cableway, the combination of a fixed cable; a tower for the cable intermediate of the terminal supports; an arm pivoted on the tower and normally projected under and across the line of the cable to support it; a traveler which carries the load and travels along the cable and shifts the said pivoted arm; means to lift the cable off the said pivoted arm while the carrier is passing; and means to restore the pivoted arm to its normal position when the traveler shall have passed.

5. In an elevated cableway, the combination of a carrying cable; a tower having a bearing to sustain the cable; track rails on the tower leading past said bearing; and a traveler having wheels which travel upon the cable, a wheel which takes below the cable and side wheels which latter travel on the said track rails.

In testimony whereof I affix my signature in the presence of two witnesses.

CHARLES HELMAN.

Witnesses:
ST. GEORGE T. C. BRYAN,
THOMAS HIGGINS.